United States Patent [19]

Adroher et al.

[11] Patent Number: 5,261,038
[45] Date of Patent: Nov. 9, 1993

[54] PEN QUALIFICATION AND VERIFICATION IN A GRAPHICS PLOTTER

[75] Inventors: Josep G. Adroher, Barcelona, Spain; Robert W. Beauchamp, Carlsbad, Calif.

[73] Assignee: Hewlett-Packard Company, Palo Alto, Calif.

[21] Appl. No.: 763,387

[22] Filed: Sep. 20, 1991

[51] Int. Cl.$^5$ .......................................... G06K 15/00
[52] U.S. Cl. ........................... 395/103; 395/109
[58] Field of Search ................. 395/101, 103, 109; 346/76 PH, 157, 139 R; 358/75, 80; 101/DIG. 29, DIG. 45, 171

[56] References Cited

U.S. PATENT DOCUMENTS 4,335,398 6/1982 Yamada ............................ 358/80
4,789,872 12/1988 Hosoi ........................... 346/76 PH Primary Examiner—Arthur G. Evans
Attorney, Agent, or Firm—David S. Romney

[57] ABSTRACT

A method of comparing a test line of a plotter pen with a subsequent plot line in order to compare selected points on the plot line with a benchmark for that particular pen. Each pen in a plotter carousel is qualified by monitoring the print contrast ratio of multiple points taken from vertical and horizontal portions of a sample line drawn by the pen. A record is maintained to indicate the good or bad qualification status of each pen in the carousel, and the appropriate benchmark for each pen is stored for future reference. By comparing the print contrast ratio of a selected sequence of points on an actual plot line with the benchmark for the pen making the plot, the satisfactory function of the pen can be periodically verified.

16 Claims, 16 Drawing Sheets

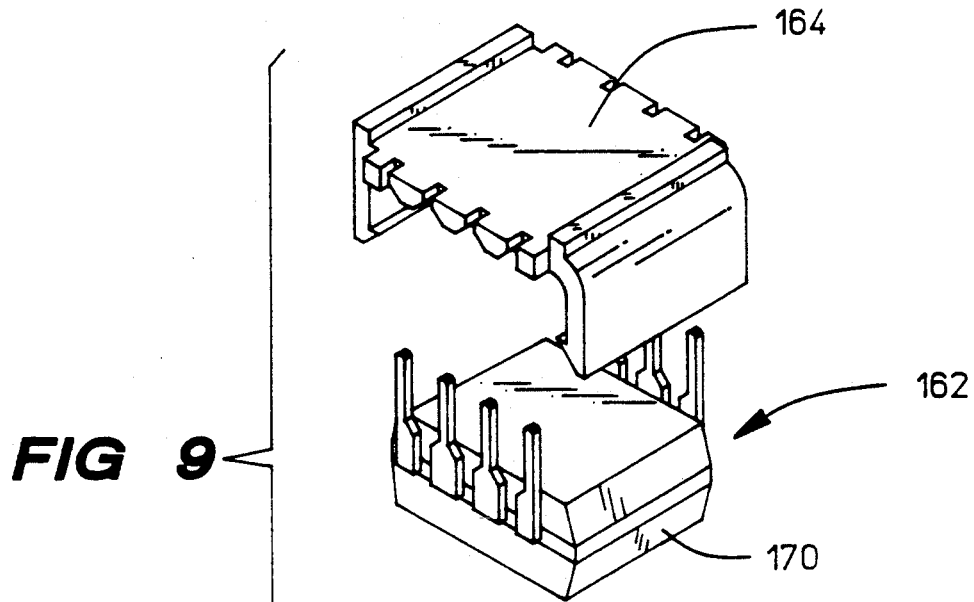
*FIG 9*
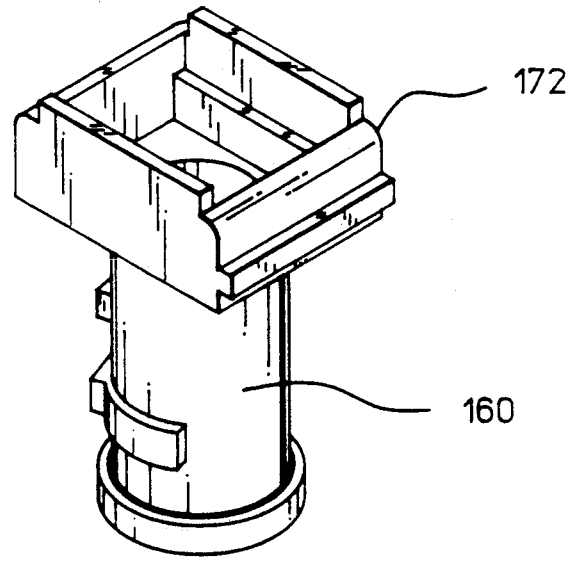
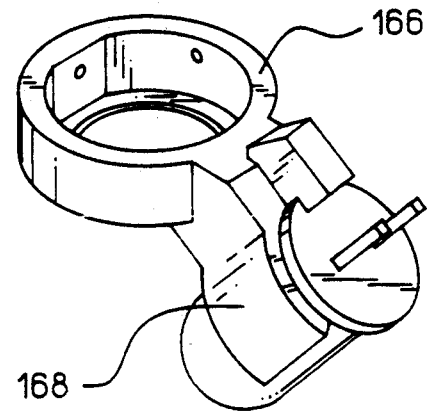
*FIG 10*

PEN QUALIFICATION AND VERIFICATION IN A GRAPHICS PLOTTER

RELATED APPLICATIONS

This application is related to U.S. application Ser. No. 07/763,889 filed Sep. 20, 1991 in the name of Messrs Boeller, Halpenny, Tarradas, Rosello and Beauchamp under the title "Monitoring and Controlling Quality Of Pen Markings On Plotting Media", and to U.S. application Ser. No. 07/764,098 filed Sep. 20, 1991 in the name of Messrs. Beauchamp, Rosello and Fernandez under the title "Optical Sensor For Plotter Pen Verification", now issued as U.S. Pat. No. 5,170,047 both of which are commonly owned by the assignee of the present application.

BACKGROUND OF THE INVENTION

The invention relates generally to pen plotters, and more specifically to monitoring and controlling the quality of pen markings on plotting media.

A typical pen plotter comprises a pen for producing markings on a medium in response to instructions from, for example, a computer. The medium such as paper is movable in a first direction along the x-axis and the pen on a main carriage is movable in a second direction along the y-axis which is perpendicular to the the first direction. Thus, by appropriate control of the drives for the pen and paper movement, any desired graphical representation can be produced on the medium. The writing system also typically comprises a rotatable pen carousel carrying a plurality of pens, for example pens of different colors. A pen handling mechanism is provided which permits a pen to move from the pen carousel into a position on the carriage for plotting on the medium and replaces that pen by another one from the carousel, for example when a different color is desired.

Writing systems such as the above-mentioned pen plotter are typically used for producing rather complex graphical representations, for example circuit layouts or construction diagrams, which are electronically stored in a computer on which they may also have been created by a user. Once the plotting of those electronically stored drawings has been initiated by a user, the plotting continues automatically and the user only has to take the completed drawing from the plotter. In practice, however, the completed drawings have not always been satisfactory as certain lines which should have been plotted are missing or have bad quality because the corresponding pen is clogged, or dried out, or is inking out or is in another way not operating properly. As a consequence thereof, the entire drawing generally had to be plotted again, in particular if a pen failure had already occurred at the beginning of the plotting process. Thus, a considerable amount of time is wasted and the efficiency of the plotting is decreased. Usually these problems are resolved by perfecting the components of the plotter so that they are less prone to failures.

In pen plotters, for example, measures are taken to avoid drying out or clogging of the pen. One of those measures is to seal the pen tips by rubber caps while they are in the pen carousel so that they stay moist and ready to write. Despite such attempts for perfection of the writing components, writing failures may still occur, for example, when the ink reservoir of the pen is empty or nearly empty or foreign substances interfere with the writing system or when any other unforeseeable faults occur. Since the plotting typically is performed with high speed, i.e., high relative velocity between the pen and the medium, even small defects in a pen lead to a noticeable degradation of the quality of the drawing.

There have been plotting systems which have a sensor that retraces along the entire actual path of a plotted line and then compares such plotted line with the computer program. Such a system is very inefficient due to the excessive time consumed, and also due to the need for precisely focusing the sensor directly on the plotted line. Also, such a system fails to take into account the different line thicknesses and varied line intensities that result from diverse pen types, colors, plotting speeds and pen force, as well as type of media and ambient lighting conditions.

BRIEF SUMMARY OF THE INVENTION

It is an object of the invention to solve the aforementioned deficiencies of the prior art, and provide a method and apparatus for assuring that a high degree of reliability is achieved for non-attended plotting. A related object is to minimize the human supervision required for operating the plotter..

Another object is to provide a pen verification system which takes into account the different drawing characteristics of all types of pens such as such as fiber-tip paper pens, fiber-tip transparency pens, rollerball pens, drafting pens for vellum and paper, and drafting pens for polyester film. A related object is to provide a pen verification system that provides predictable performance for different color pens, different line thicknesses, varied pen speeds and pen pressures, and all media types such as paper, vellum, polyester and translucent material.

A further object is to provide adequate optical sensing of pen lines under varying ambient light conditions.

In accordance with the foregoing objects, the invention provides a method of monitoring and controlling the quality of pen markings on a plotting medium by qualifying each pen based on optically sensing across a sample line drawn on an actual medium. During each subsequent plotting task of a particular pen which has been qualified, an actual line plot is optically sensed acroww a selected point to make a comparison with the sample line. If the actual line plot is unsatisfactory, the deficient pen is replaced and the plot is restarted from the beginning, or retraced from the last good verification, or is stopped to allow the user to select an appropriate corrective procedure.

In another separate and important aspect of the invention, a customized optical sensor is provided for monitoring plotter pen performance by sensing the quality of lines drawn on a medium. An LED emitting a green light beam is angularly directed toward an underlying line so as to reflect into an optical sensor which measures the print contrast ratio of a point on the line. Circuit means amplifies and filters the signal generated by the optical sensor.

In another separate and important aspect of the invention, a method is provided for comparing a test line of a plotter pen with a subsequent plot line in order to compare selected points on the plot line with a benchmark for that particular pen. Each pen in a plotter carousel is qualified by monitoring the print contrast ratio of multiple points taken from vertical and horizontal portions of a sample line drawn by the pen. A record is maintained to indicate the good or bad qualification status of each pen in the carousel, and the appropriate benchmark for each pen is stored for future reference. By comparing the print contrast ratio of a selected sequence of points on an actual plot line with the benchmark for the pen making the plot, the satisfactory function of the pen can be periodically verified.

DESCRIPTION OF THE DRAWINGS

FIG. 9 is a perspective view showing an optical sensor holder which is mountable on the z-axis carriage;

FIG. 10 is a perspective view showing and LED holder which is attachable to the optical sensor holder;

DETAILED DESCRIPTION OF PREFERRED EMBODIMENTS

Figure 1:
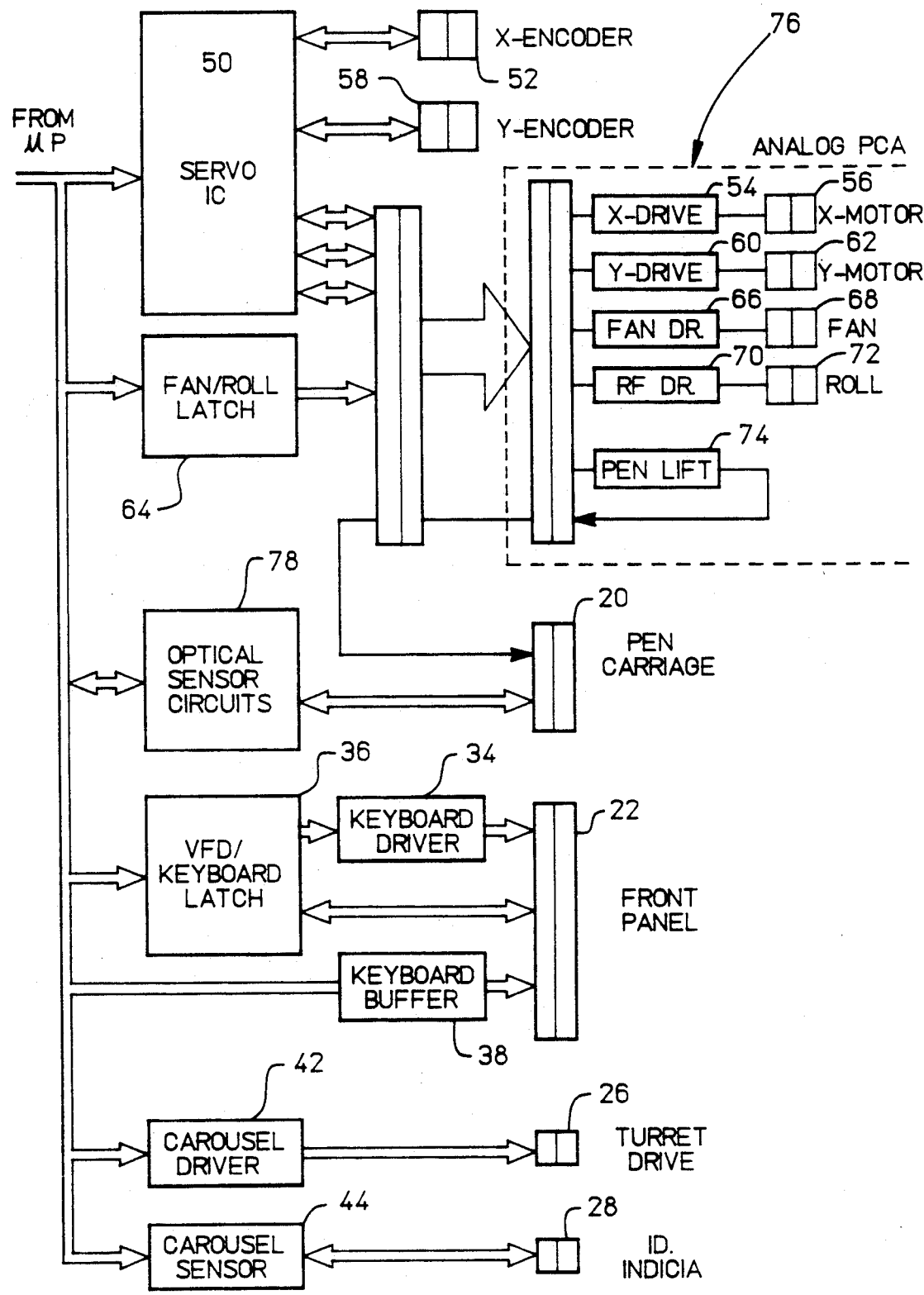
FIG. 1 is a block diagram showing the support circuits for a plotter incorporating the present invention.

Generally speaking, the invention is incorporated in a pen plotter comprising a pen for producing markings such as graphical representations on a medium, for example on a sheet of paper. The pen is held on a main carriage by a z-axis carriage which can be lowered such that the tip of the pen contacts the medium in order to produce markings thereon. The pen comprises an ink reservoir containing ink of a certain color. The pen is held on the z-axis carriage in a way so that it can easily be replaced by another pen, for example if a different color for the graphical representation is desired or if the ink reservoir in the pen is empty. The replacement of the pen can be done manually by a user, but it is preferred to perform the replacement automatically under-computer control. Seeveral replacement pens and additional pens of different colors can be arranged in a pen carousel (not shown) from which they can be transported to the z-axis carriage and inserted there. For producing two-dimensional plots on a sheet of paper, the paper is moved in a first direction (x-direction) and the main carriage is moved in a second direction (y-direction) orthogonal thereto. The driving of the paper can be accomplished by means of a grit wheel and pinch wheel assembly between which the paper is moved. By appropriate movement of the paper (either in the positive or negative X-direction) and coordinated related movement of the main carriage (either in the positive or negative Y-direction), any desired graphical representation can be made on the paper sheet. Of course, the invention is not limited to any particular type of plotter, but can be utilized in any plotter configuration where line vectors are drawn on media by pens. For example, another type of plotter which may utilized the invention holds the paper stationary while the main carriage is movable in the X- and Y-directions so that the pen can be, placed on any desired point of a media sheet.

A sensing system intermittently monitors the quality of the pen on the media by scanning across a point on a line, with the point overlying a white reference strip in the platen and illuminated by light emitted from a light source such as an LED emitting a beam of green light.

The output signals of the sensing system are amplified, filtered and converted into digital data. This digital data is then supplied to a microprocessor for comparison with the benchmark data stored for that particular pen (or type of pen). In response to such comparison, the microprocessor provides output signals indicating a good pen or a bad pen.

Various corrective actions can be taken when a bad pen is detected by the sensing system, or that a good pen is malfunctioning. For example, the plotter can be pre-programmed so that the bad/malfunctioning pen is automatically replaced by another pen, or that user can be warned that a writing error has occurred, so that he can decide on appropriate action, or those markings which do not meet the desired quality can be replotted.

Referring more specifically to the drawings, FIG. 1 is a block diagram showing the circuit interconnections between a microprocessor (not shown) and the various functional components of the plotter. The mechanical components include a pen carriage 20, front panel 22, turret drive 26 for a pen storage carousel (not shown), and ID indicia 30 on the pen storage carousel to indicate the type of pens available therein for plotting. A keyboard driver 34 connects through a VFD/keyboard latch 36 to receive inputs from the microprocessor and to provide inputs to a vacuum fluorescent display on the front panel 22. The display also receives inputs from the microprocessor.

The turret drive 26 receives inputs from the microprocessor through a carousel driver 42 to rotate the carousel to a proper position for transferring pens back and forth between the carousel and the pen carriage. A carousel sensor 44 interacts with the ID indicia 30 to identify which carousel slots are empty and which type of pens are in each of the other carousel slots.

A servo integrated circuit 50 receives inputs from the microprocessor and also interconnects an X-encoder 52 through an X-drive 54 to an X-motor 56 in order to monitor the position of the medium in the X-direction and then cause the X-motor to move the medium to a new position. In a similar way, interconnections are made from a Y-encoder 58 through a Y-drive 60 to a Y-motor 62 in order to monitor the position of the pen carriage in the Y-direction and then cause the Y-motor to move the pen carriage to a new position.

A fan/roll latch 64 receives inputs from the microprocessor to a fan drive 66 to operate a fan 68 which provides a vacuum through holes in the platen to help hold the media securely at the point where a pen is drawing vectors on the media. The latch 64 also provides inputs through a rollfeed drive 70 to a media roll 72 for bringing media into position under the pen carriage 20 in order to commence a new plot.

A pen lift 74 is included with the other drives on an analog printed circuit assembly 76 and receives inputs from the microprocessor through the servo IC 50 and then sends output signals to the pen carriage 20 in order to move the pen from a normally raised position to a lowered position into contact with the media at the point where it overlies the platen. Optical sensor circuits 78 provide input signals to a light source on the pen carriage 20 and then process output signals from the optical sensor on the pen carriage 20 back to the microprocessor.

Figure 2:
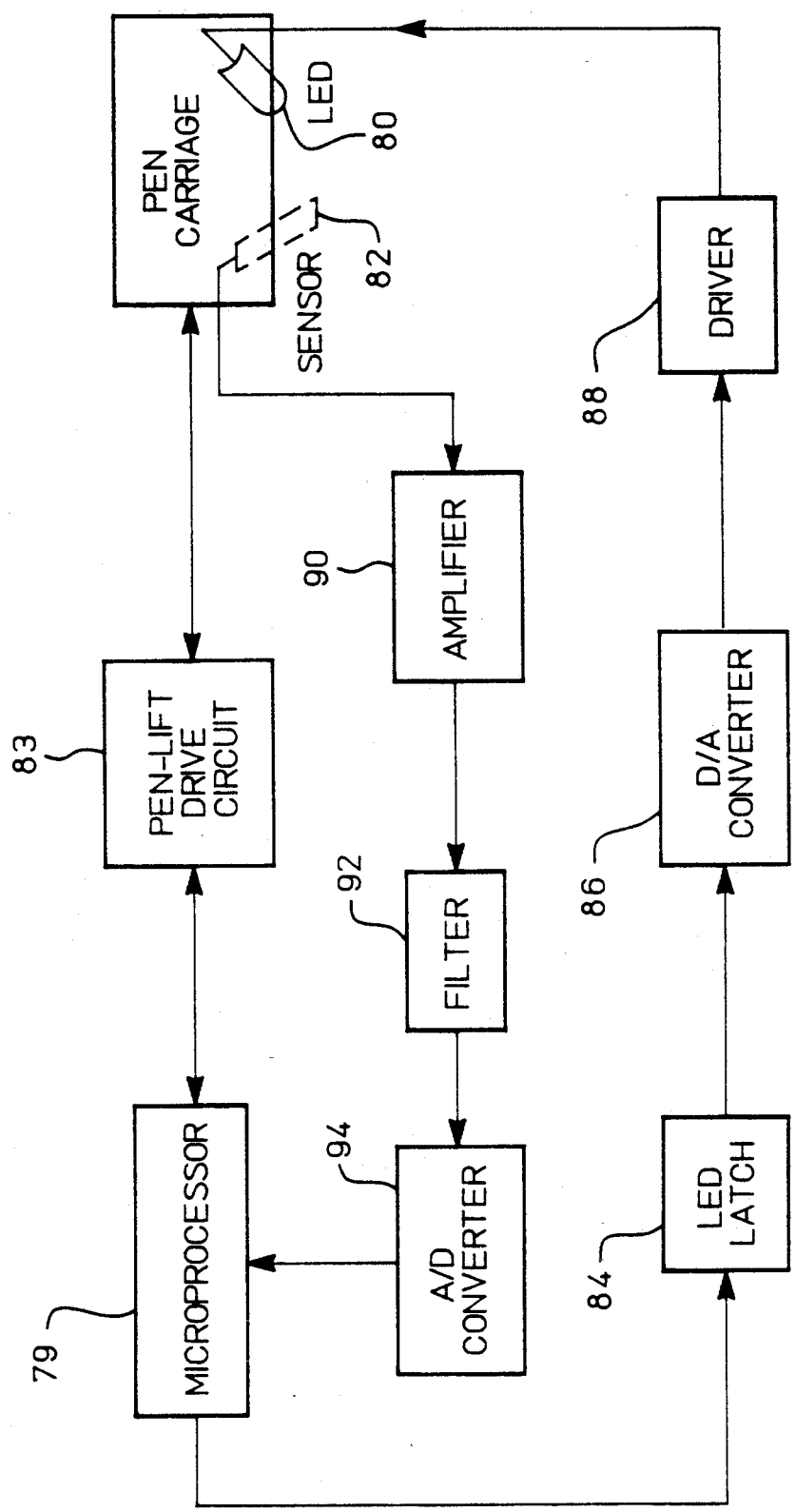
FIG. 2 is a block diagram showing various circuit interconnections between a pen carriage and a microprocessor.
Figure 3:
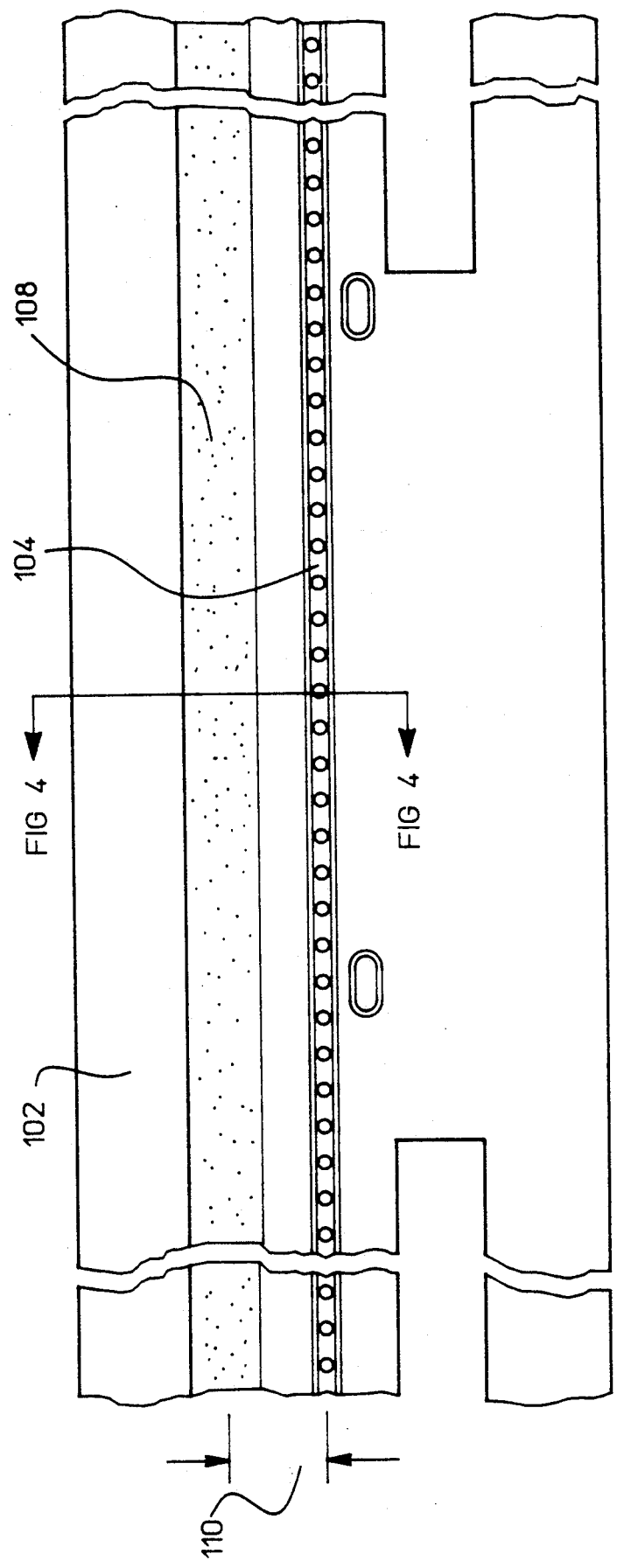
FIG. 3 is a fragmentary top view of a plotter platen of a presently preferred embodiment of the invention.
Figure 4:
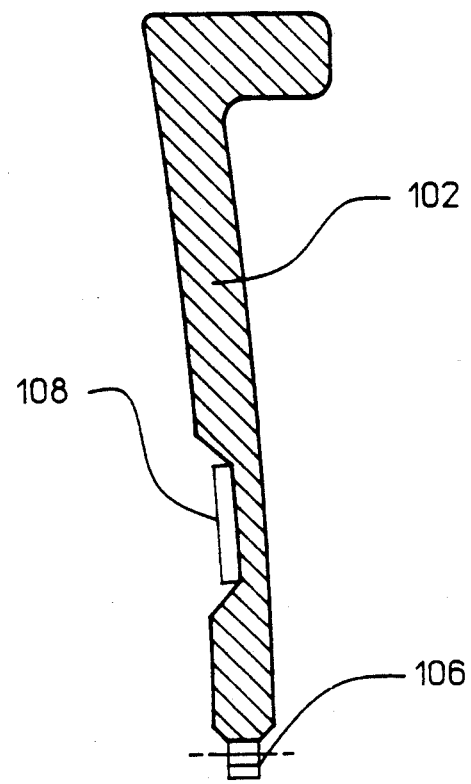
FIG. 4 is a sectional view of the plotter platen taken along the line 4—4 in FIG. 3.
Figure 5:
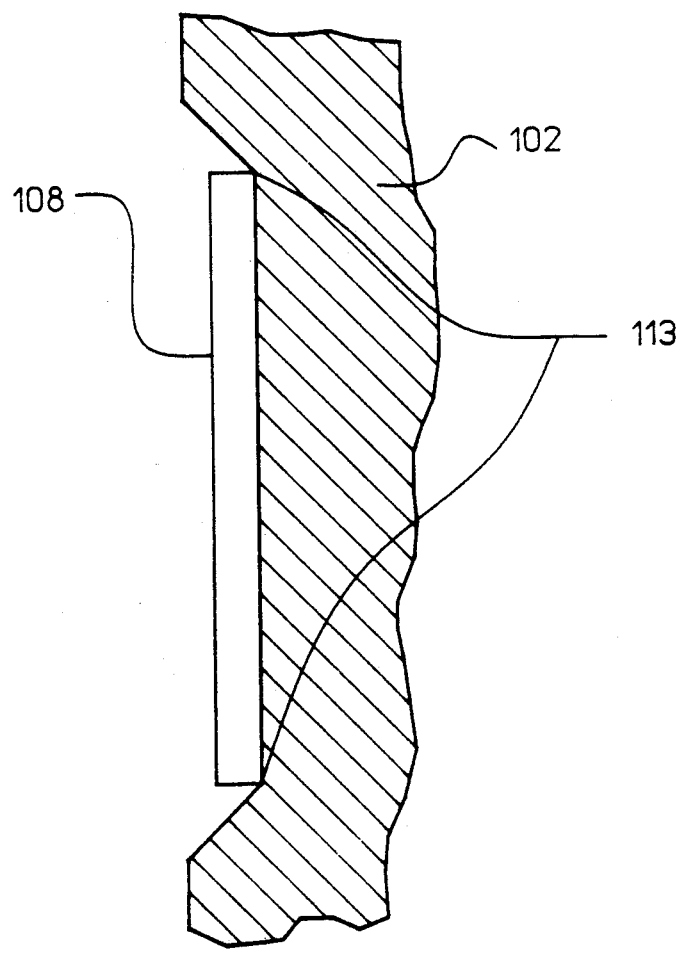
FIG. 5 is an enlarged sectional view showing a white reference strip imbedded in the plotter platen.
Figure 13A:
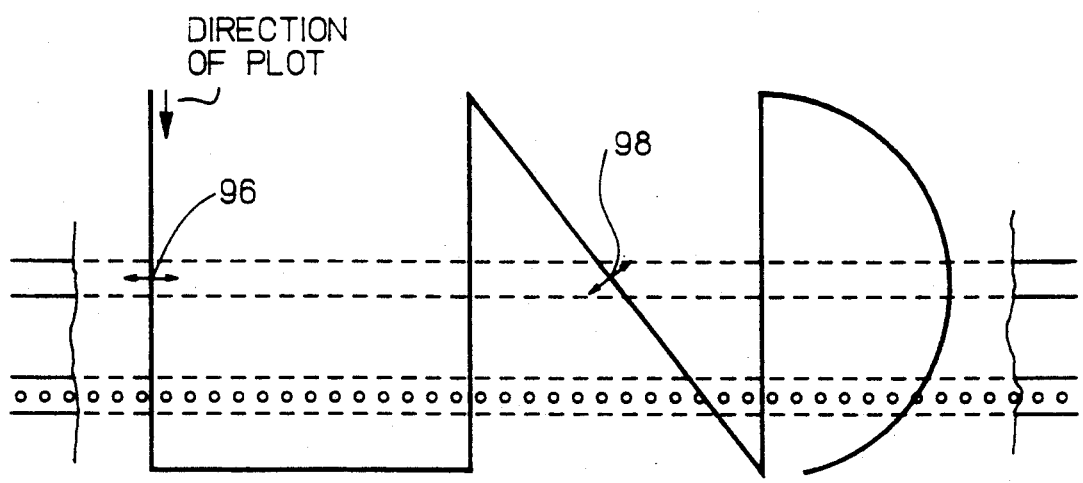
FIGS. 13A and 13B is a schematic diagram showing exemplary locations for optically sensing the quality of a line by scanning across a point on the line after the medium has been moved so that the point overlies the white reference strip in the platen.
Figure 13B:
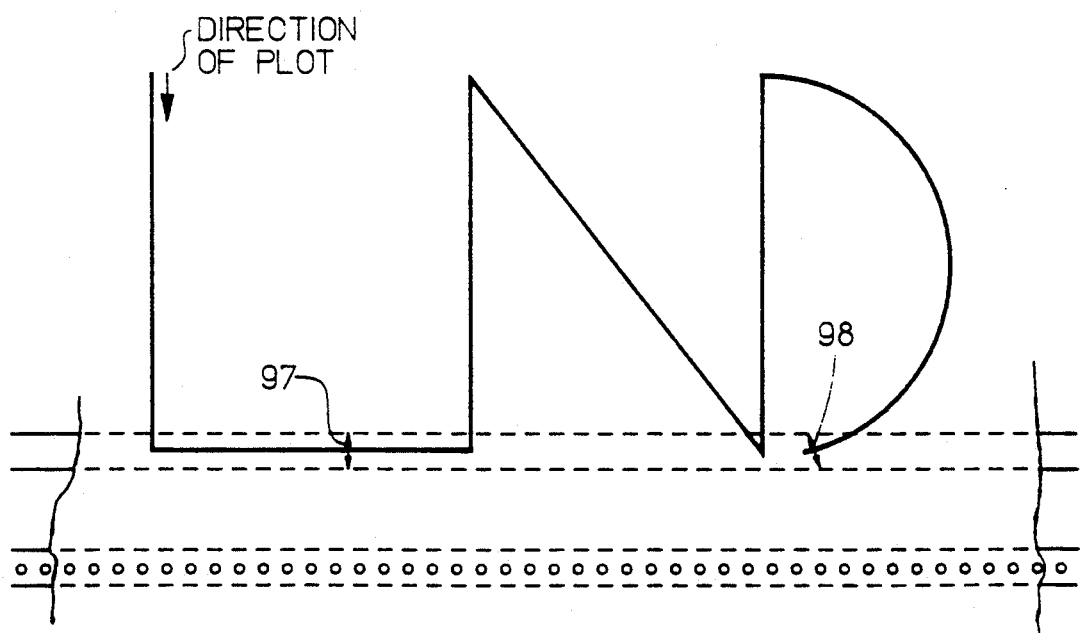

Referring now to FIG. 2, the various interconnecting circuits for actuating the pen verification procedures are shown in a block diagram. Since a light source in the form of an LED 80 and a optical sensor 82 are directly mounted on the pen carriage 20, a pen-lift drive circuit 83 is interconnected between the microprocessor 79 and the pen carriage 20 to move the carriage into the optimum focal distance above the media. Signals from the microprocessor 79 are passed through latch 84 to a digital/analog converter 86 which produces an output signal which passes through driver 88 to the LED 80. The LED transmits a wide beam of light (see outwardly flared arrows schematically extending below LED 80 in FIG. 8) having a color centered in the visual spectrum to a predetermined locale around a line vector on the medium, and the sensor 82 measures the intensity of the reflected light as the sensor scans across the line (i.e., from one side of the line through a point on the line to the other side of the line). Typical scans of actual plots are shown in FIG. 13 at 96, 97, and 98, and a typical curve of the intensity for a satisfactory pen marking is shown in graph 100 of FIG. 14. In order to enhance the reliability of such light intensity curves, a customized platen 102 is provided. In addition to the usual drawing notch 104 which includes vacuum apertures 106 for holding the drawing medium in secure position under a pen tip, the invention provides a white reference strip 108 (see FIG. 3) which extends parallel to the drawing notch 104 in the Y-direction, with the strip and notch having the same predetermined offset 110 along their full length. As shown in the detailed sectional views of FIGS. 4 and 5, the white reference strip in the presently preferred embodiment is formed by a white tape which is recessed below the surface of the platen 102 in a groove 112 so as to be positioned along the bottom surface of the groove without the tape visibly extending up either side 113 of the groove. Because of different light reflective properties of different types of media and different room environments, it is necessary to conduct an initialization scan at the beginning of each plot (see FIG. 15). By proper movement of the carriage 20 in the Y-direction by the Y-drive 60 and coordinated movement of the medium 114 in the X-direction by the X-drive 54, the point of the line being scanned is positioned directly over the center of the white strip 108 (see FIG. 14).

Figure 6:
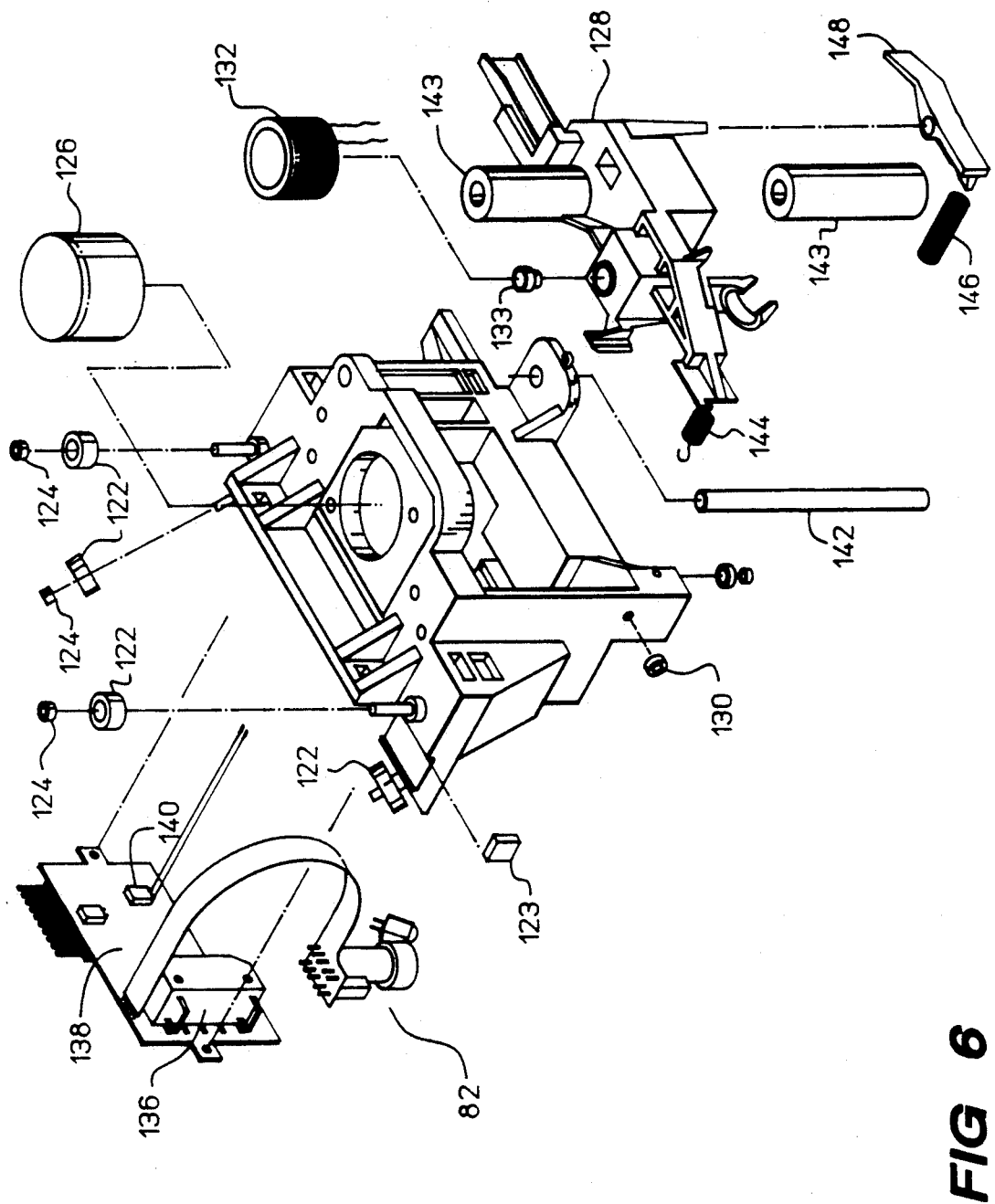
FIG. 6 is an exploded view of the main carriage of the embodiment of FIG. 3.
Figure 8:
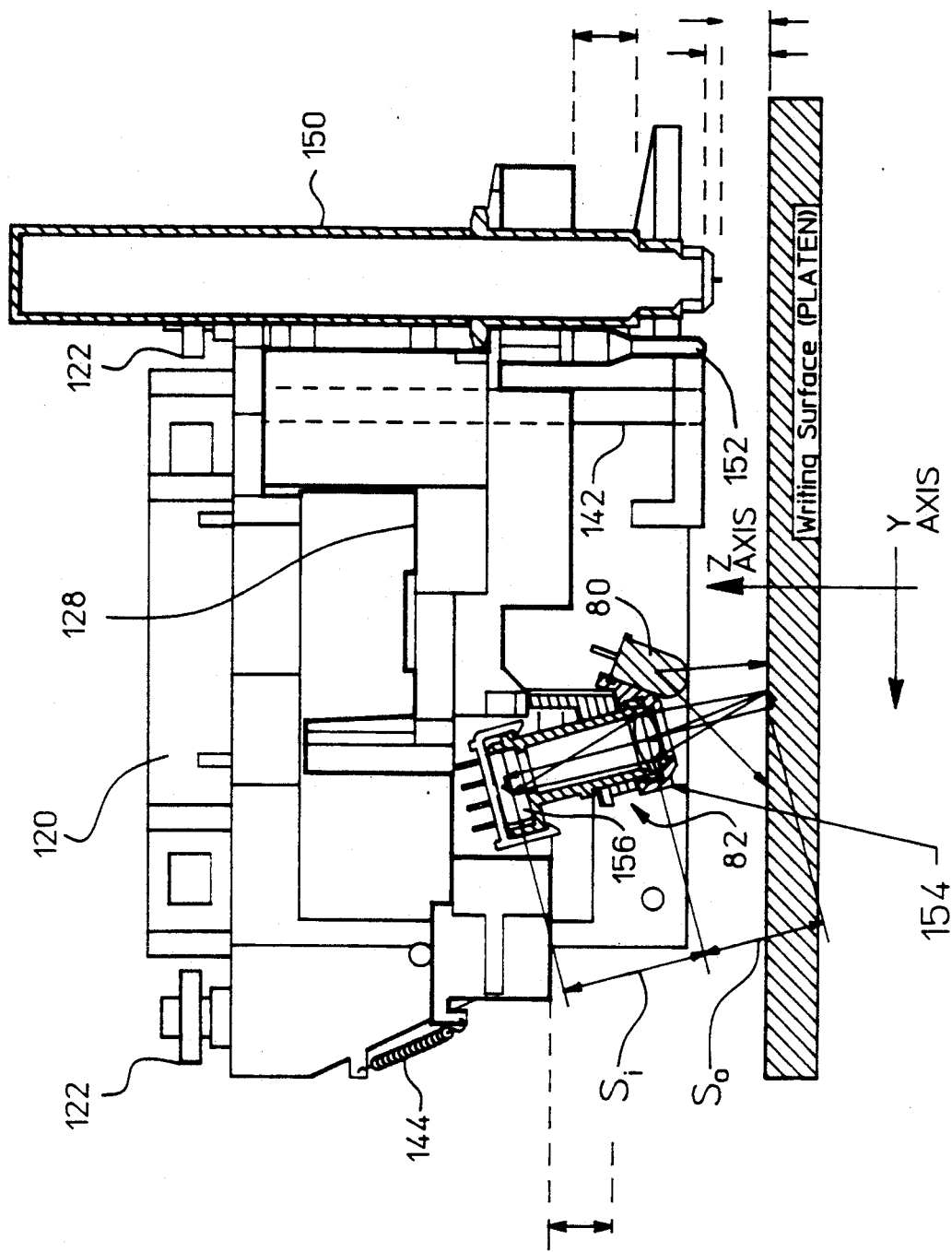
FIG. 8 is a side view of the main carriage of FIG. 6 showing the z-axis carriage (darkly outlined) holding a pen in raised position in raised position.

The structural details of the pen carriage 20 are shown in the exploded view of FIG. 6. and the front view of FIG. 8. A main carriage 120 carries variously positioned Y-direction tires 122 mounted on bearings 124, and a bumper 123, to facilitate the movement along the Y-axis. In order to provide movement of the z-carriage and the pen between a raised position to a lowered position (see the double pointed arrows in FIG. 8), the main carriage also carries a magnetic cup 126 and a Z-direction tire 130 for engagement with a Z-axis carriage 128. An energized coil 132 mounted on an insert 133 in the Z-axis carriage is magnetically pushed away from its matching magnetic cup 126 to move the pen into the down position. The actual location of the pen (and sensor/LED assembly described in more detail below) relative to the underlying media is monitored by an encoder scale 134 which moves up and down adjacent to an optical encoder 136. A carriage PCB 138 carries the encoder 136 and also provides the circuit interconnections through wires 140 to the coil as well as the circuit interconnections to the LED 80 and the sensor 82. A stationary inner linear bearing 142 engages a matching moving outer bearing sleeve 143, and an expansion spring 144 holds the z-carrage in a normally raised position.

Figure 7:
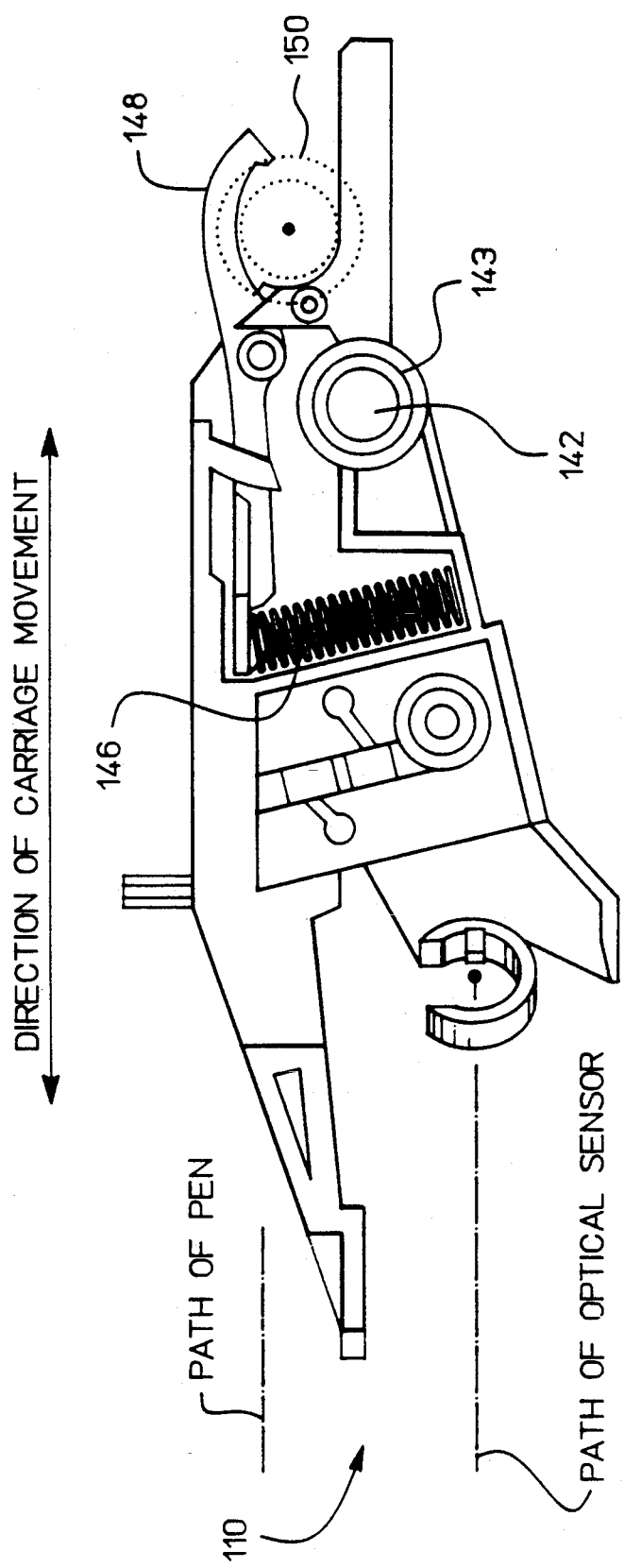
FIG. 7 is a bottom view of the z-axis carriage showing a pen path which is offset from an optical sensor path.

When a pen is mounted on the carriage 20, a compression spring 146 forces a pawl 148 into locking engagement against the outer pen casing 150 (see FIG. 7).

It is preferable to calibrate each plotter before it is used in order to optimize the ability of the sensor to measure the light intensity of a plotted line. Accordingly, as best shown in FIG. 8, the pen is removed and a paper feeler 152 can then be used to determine the actual distance to a sheet of underlying media for this particular plotter. In addition, the paper feeler can scan the platen along the entire length of the Y-axis to determine variations in this actual distance measurement. Such actual distances measured during calibration are recorded in memory so that during normal operation the Z-axis carriage can be moved to achieve the optimum focal distances as shown in mm in the drawing of FIG. 8. It has been determined that the present invention nevertheless operates satisfactorily for a photodiode 156 spaced a distance "Si" of 17.2 mm from a lens 154 even though the distance "So" of 15.1 mm between the lens and the medium may vary plus or minus 1.5 mm.

The sensor 82 is shown in detail in FIGS. 9–10 and includes a casing 160, a chip assembly 162 a cap 164, and a sleeve 166 having a bracket 168 for holding the LED 80. The sleeve snaps into position at the bottom of the casing 169 and holds the lens in fixed position inside the sleeve at the lower end of the casing. The chip assembly includes a photodiode as well as a two-stage amplifier, and the lower portion 179 of the chip assembly is transparent (such as clear plastic) to allow reflected light to pass unimpeded to the photodiode. The cap 164 must fit snugly over the top end of the chip assembly to nest into a casing receptacle to prevent any extraneous light from passing through to the photodiode. Although both the sensor and the LED are shown at an angle with respect to the Z-direction, it is possible to have other angular positioning of the sensor, so long as the LED preferably emits light at an angle to avoid undue specular glare from the media.

Thus, the invention provides a method and apparatus for using a uniquely designed optical sensor that periodically senses the quality of plotted lines by scanning across selected points on the lines, and measuring the difference in contrast between the actual plotted line and a benchmark such as a default value or an actual value obtained when that particular pen was qualified. When the optical line sensor detects a pen failure or pen deficiency, the plotter corrects the problem by picking a fresh pen and retracing the plot from the last good verification point, restarting the plot, or stopping and alerting the user that a pen failure has been detected.

Figure 12:
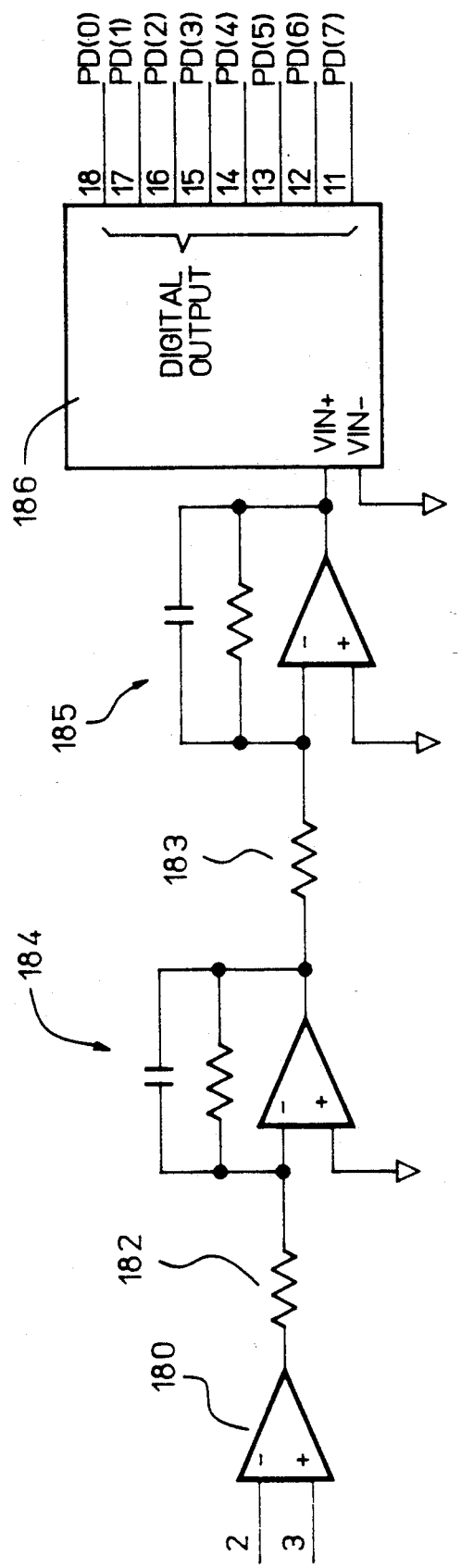
FIG. 12 is a schematic circuit diagram showing an amplifier and filter circuit for processing a signal from the sensor.

FIG. 12 shows in more detail the processing of the output signal from the sensor through op-amp 180, resistors 182,183, filter circuits 184,185 and A/D converter 186.

Figure 11:
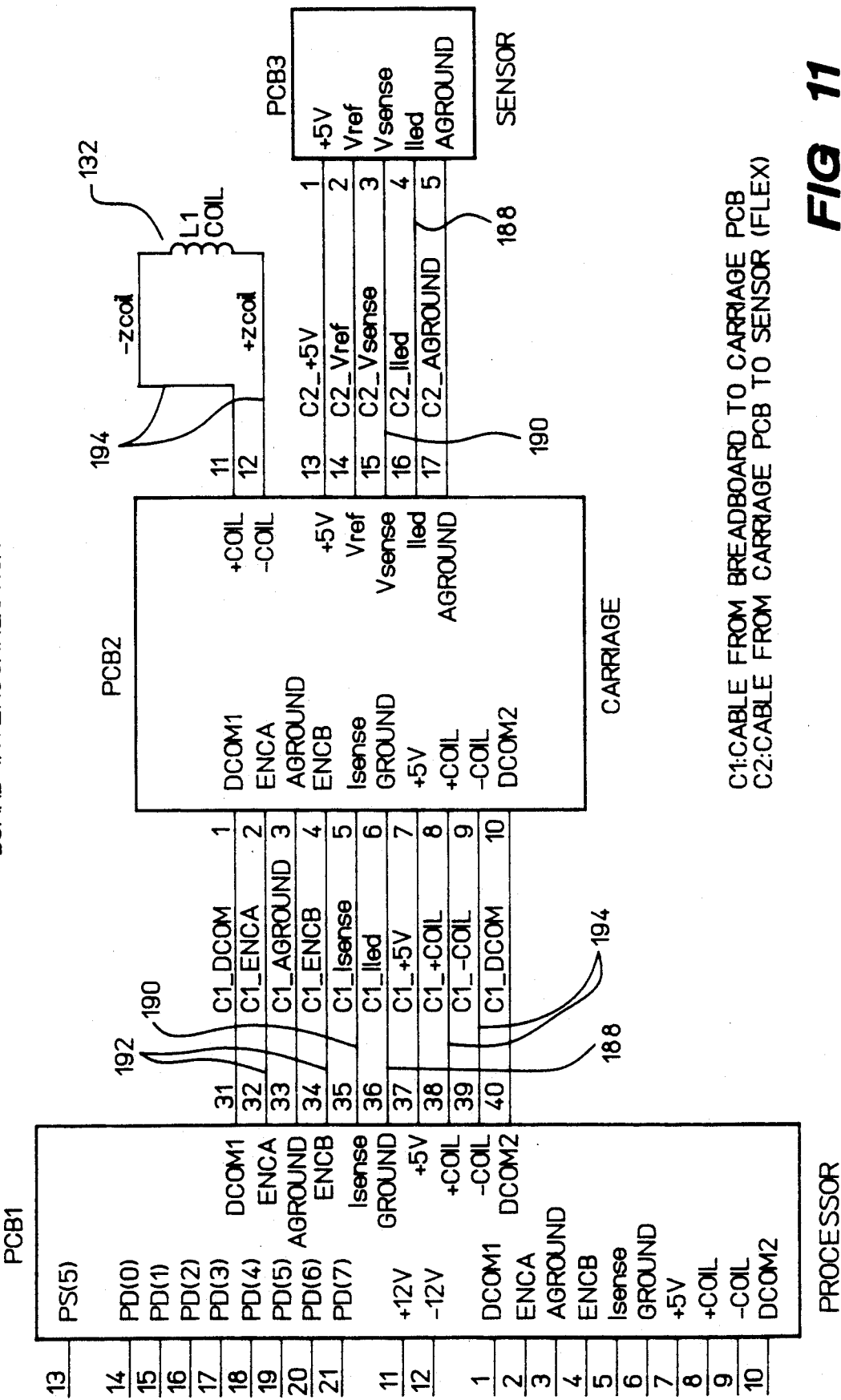
FIG. 11 is a circuit diagram showing the circuit interconnections between the processor board, the carriage board and the LED/sensor.

FIG. 11 shows the interconnections between PCB 1 (processor), PCB 2 (carriage) and PCB 3 (sensor) including the LED input 188, the sensor output 190, the encoder circuits 192 and the coil circuits 194.

Figure 14:
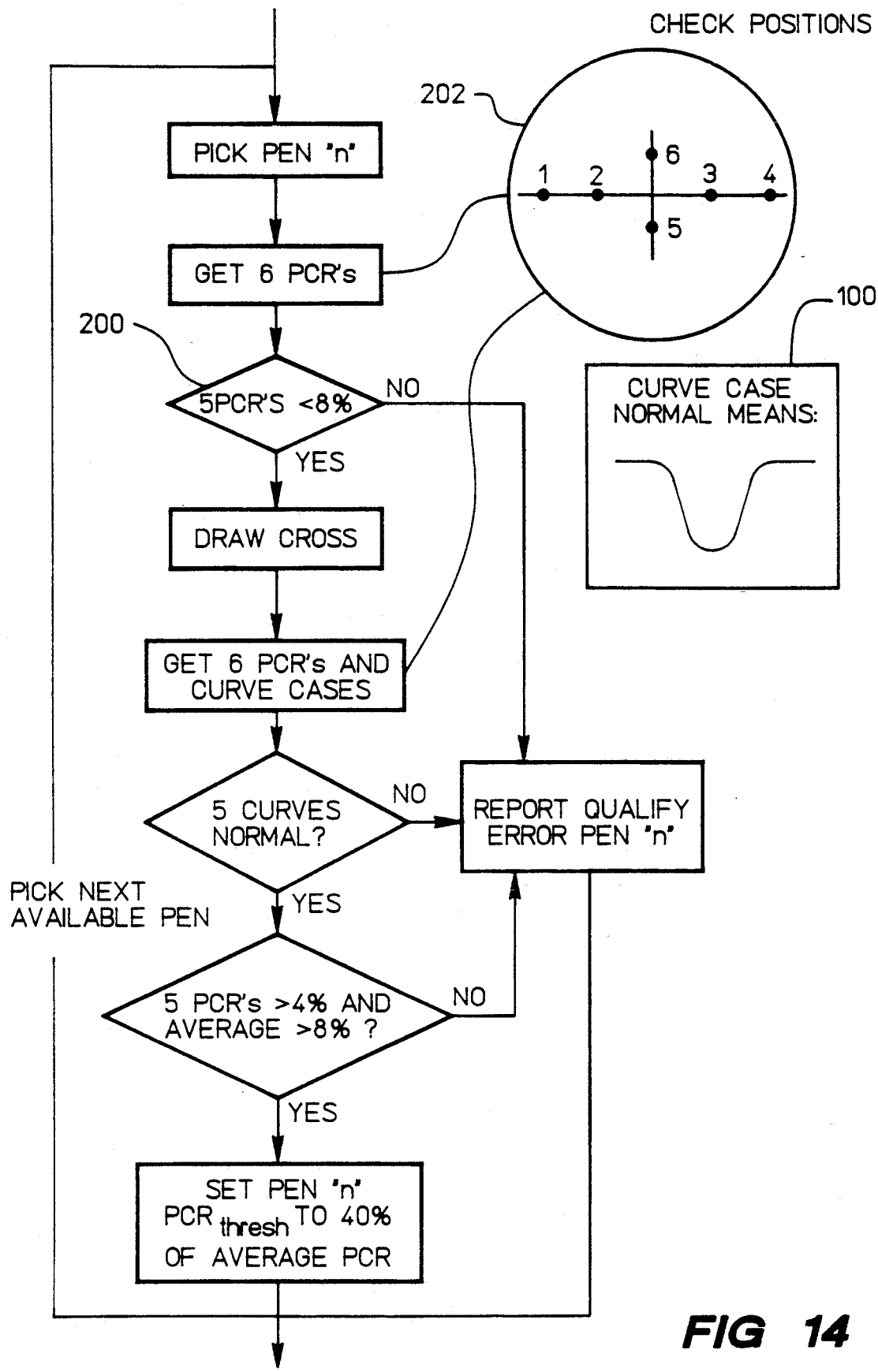
FIG. 14 is a flow chart for qualifying pens and thereafter setting the print contrast ratio (PCR) threshhold for that particular pen.
Figure 15:
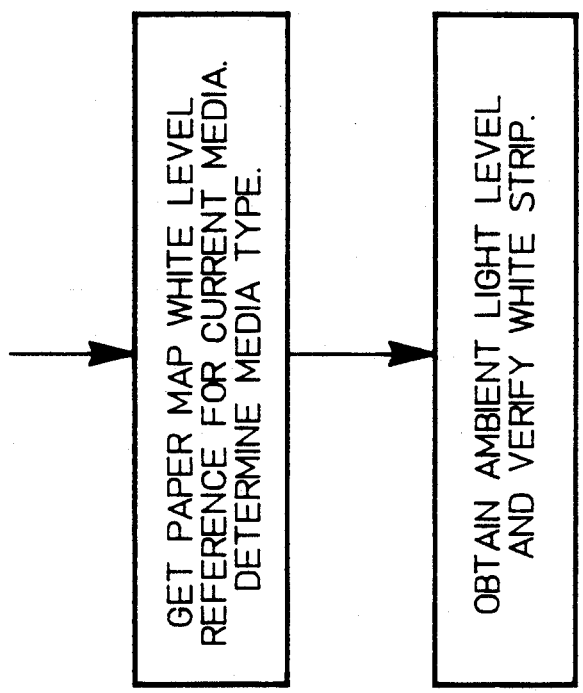
FIG. 15 is a flow chart showing the initialization procedure for the beginning of each plot.

In the flow chart of FIG. 14, it is important to first check the media such as paper at the actual spot where the sample vectors are to be drawn to be sure there are not already previous plots or other non-white interference. The first percentage measurement at 200 is based on the percentage drop in reflected signal intensity from total white to absolute dark (total light absorbence). Thus, if five of the proposed six points each show a print contrast ratio of less than 8%, the it is ok to proceed to the next stage of actually drawing the sample plot as shown at 202.

In order to establish the PCR threshhold, various procedures can be used. In the preferred form of the invention, the average intensity of the PCRs for five points is computed, and then so long as the pen plots checked during the pen verification procedure have PCRs of not less than 40% of such average, then the plots actually tested are deemed satisfactory. If a user is using only black pens and does not need high quality plotting, it is possible to forego the actual pen qualification procedure and just accept that any pen having a print contrast ratio of more than the default of 8% on the scale of percentage signal drop from all white to total darkness will be deemed a "good" pen.

Figure 16:
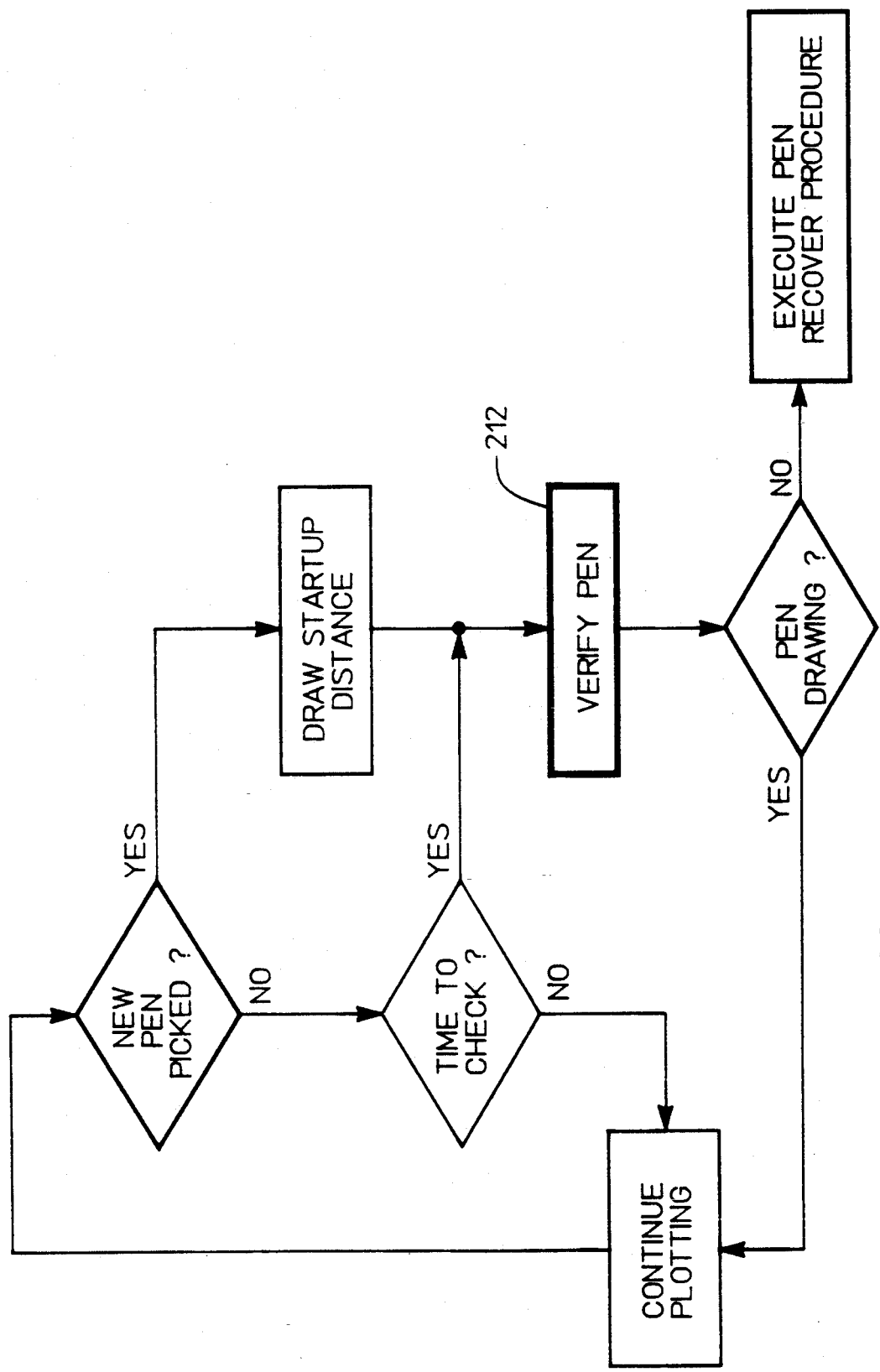
FIG. 16 is a flow chart showing the overall procedure for conducting pen verification during plotting.
Figure 17:
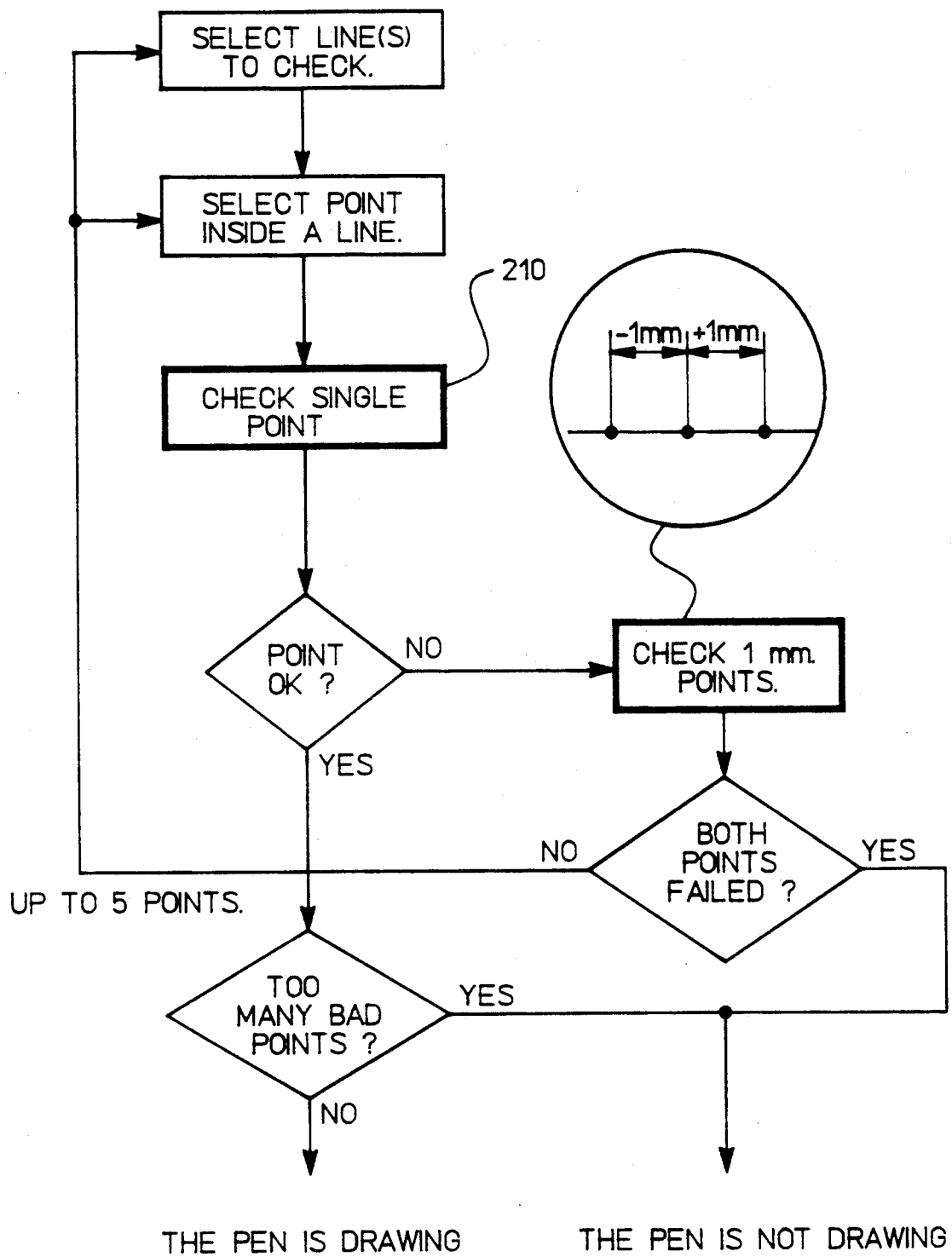
FIG. 17 is a detailed flow chart for the actual pen verification procedure.
Figure 18:
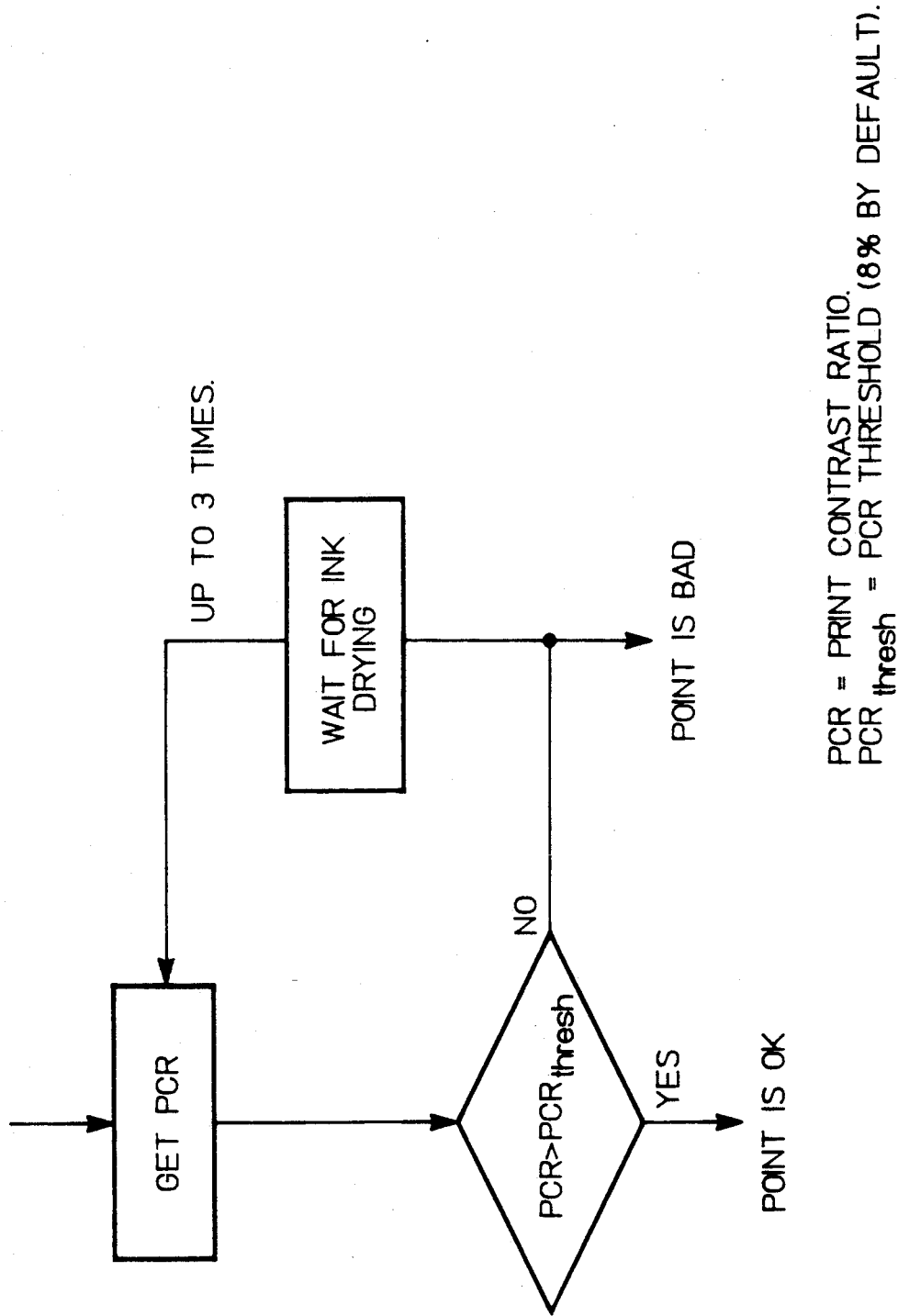
FIG. 18 is a detailed flow chart for checking selected points.

With respect to FIG. 17, the details of box 210 are shown in FIG. 18. With respect to FIG. 16, the details of box 212 are shown in FIG. 17. All of the flow charts are deemed to be self explanatory and show the presently preferred embodiment for pen qualification and pen verification as taught by the present invention.

It should be understood that the foregoing description is only illustrative of the invention. Various alternatives and modifications will be understood and developed by those skilled in the art without departing from the spirit of the invention. Accordingly, the present invention is intended to include all such alternatives, modifications and variations which fall within the scope of the following claims.

We claim:

1. A method of comparing a media test line of a particular plotter pen with a subsequent media plot line of the same particular plotter pen without having to do any color separation, and wherein the plotter pen has its own unique color, comprising the steps of:

drawing a sample line with a selected pen to establish a pen benchmark;

obtaining a white background reference for current media in a plotter based on local ambient light conditions;

monitoring the quality of the sample line at a plurality of points;

checking the quality at each of the plurality of points by comparing the light intensity contrast with the white background reference to determine whether or not the quality is within certain predetermined standards sufficient to qualify the pen for plotting;

commencing an actual plot with the pen which made the sample line; and verifying at multiple points on the actual plot the satisfactory performance of the pen by comparison with the pen benchmark.

2. The method of claim 1 wherein a plurality of pens are held in a plotter carousel, and wherein said drawing and monitoring and checking steps are performed for every pen in the plotter carousel, and further including storing a pen benchmark for each pen in the plotter carousel.

3. The method of claim 2 which further includes grouping together in the plotter carousel a plurality of pens having the same characteristics.

4. The method of claim 3 wherein said grouping step includes grouping together in the plotter carousel a plurality of pens having the same color.

5. The method of claim 2 which further includes storing a record of which pens in the carousel are determined by said checking step to be qualified and which pens are determined by said checking step to be bad pens.

6. The method of claim 1 wherein said monitoring step includes moving an optical sensor across a plurality of points of the sample line to measure the print contrast ratio of the sample line compared to an adjacent white reference background, and wherein said verifying step includes moving the optical sensor across multiple points on the actual plot to measure the print contrast ratio of the plot line compared to an adjacent white reference background 7. The method of claim 6 wherein a print contrast ratio of between 5-10% is required for a given plurality of points on the sample line in order to qualify the pen.

8. The method of claim 7 wherein the verifying step includes determining whether the print contrast ratio at the multiple points of the actual plot is above a threshhold percentage.

9. The method of claim 8 wherein the threshhold percentage used in said verifying step is based on the average print contrast ratio of the plurality of points of the sample line.

10. The method of claim 1 wherein said sample line includes a vertical line portion and a horizontal line portion.

11. The method of claim 10 wherein said monitoring step includes monitoring a plurality of points on the vertical line portion and a plurality of points on the horizontal line portion.

12. A method of establishing a benchmark for a plotter pen having a particular color, without having to perform any color separation, comprising the steps of:

choosing a media test location by confirming that its light intensity provides a satisfactory white background reference;

drawing a test line with the plotter pen in the media test location;

sensing the print contrast of the test line with the white background reference to obtain a benchmark value for the plotter pen;

storing the benchmark value obtained by said sensing step for future reference;

periodically interrupting the actual plotting of a pen plotter using the plotter pen in order to verify the satisfactory operation of the pen by obtaining the print contrast of an actual plot line with the white background reference; and comparing the print contrast of said obtaining step with the benchmark value associated with that particular plotter pen.

13. The method of claim 12 wherein said sensing step further includes sensing the print contrast of the test line at a plurality of spaced-apart points.

14. The method of claim 12 wherein said obtaining step further includes obtaining the print contrast of an actual plot line at a plurality of spaced-apart points.

15. The method of claim 12 wherein said comparing step further includes comparing the print contrast of said obtaining step with a predetermined default benchmark value.

16. The method of claim 12 wherein said comparing step further includes comparing the print contrast of said obtaining step with a benchmark value which is a threshhold percentage of the print contrast obtained by said sensing step.

* * * * *